(12) United States Patent
Thiel et al.

(10) Patent No.: US 7,571,962 B2
(45) Date of Patent: Aug. 11, 2009

(54) FITTING FOR A VEHICLE SEAT

(75) Inventors: Peter Thiel, Remscheid (DE); Ralf Flesch, Solingen (DE); Martin Stilleke, Recklinghausen (DE); Tony Ferenc, Goodrich, MI (US); Ray Weir, Auburn Hills, MI (US)

(73) Assignee: Keiper GmbH & Co. KG, Kaiserslautern (DE)

( * ) Notice: Subject to any disclaimer, the term of this patent is extended or adjusted under 35 U.S.C. 154(b) by 260 days.

(21) Appl. No.: 11/654,825

(22) Filed: Jan. 18, 2007

(65) Prior Publication Data
US 2007/0170764 A1 Jul. 26, 2007

(30) Foreign Application Priority Data
Jan. 24, 2006 (DE) .................. 20 2006 013 783 U
Sep. 21, 2006 (DE) ...................... 10 2006 044 490

(51) Int. Cl.
B60N 2/02 (2006.01)
(52) U.S. Cl. .................... 297/367; 297/362; 297/378.12
(58) Field of Classification Search ................ 297/367, 297/362, 378.12
See application file for complete search history.

(56) References Cited

U.S. PATENT DOCUMENTS

| 5,586,833 | A | * | 12/1996 | Vossmann et al. | 403/359.6 |
| 5,810,442 | A | * | 9/1998 | Ito et al. | 297/362.11 |
| 6,095,608 | A | * | 8/2000 | Ganot et al. | 297/367 |
| 6,305,748 | B1 | * | 10/2001 | Ohba | 297/362 |
| 6,318,806 | B1 | * | 11/2001 | Levert et al. | 297/367 |
| 6,619,743 | B1 | * | 9/2003 | Scholz et al. | 297/362 |
| 6,637,821 | B2 | * | 10/2003 | Lee et al. | 297/362 |
| 6,799,806 | B2 | | 10/2004 | Eppert et al. | |
| 7,144,082 | B2 | * | 12/2006 | Ohba | 297/367 |
| 7,188,903 | B2 | * | 3/2007 | Finner et al. | 297/362 |
| 7,264,566 | B2 | * | 9/2007 | Dill et al. | 475/164 |
| 2003/0090138 | A1 | | 5/2003 | Rabbach et al. | |
| 2003/0214165 | A1 | | 11/2003 | Finner et al. | |
| 2005/0179297 | A1 | * | 8/2005 | Finner et al. | 297/362 |
| 2006/0055223 | A1 | | 3/2006 | Thiel et al. | |
| 2006/0061197 | A1 | | 3/2006 | Messerschmidt et al. | |
| 2006/0284471 | A1 | | 12/2006 | Assmann et al. | |

FOREIGN PATENT DOCUMENTS

| DE | 102 32 030 A1 | 2/2004 |
| DE | 10 2004 044 753 A1 | 3/2006 |
| EP | 0 872 375 B1 | 10/1998 |

(Continued)

*Primary Examiner*—Laurie K Cranmer
(74) *Attorney, Agent, or Firm*—Womble Carlyle Sandridge & Rice, PLLC

(57) ABSTRACT

In the case of a fitting (10) for a vehicle seat, in particular for a motor vehicle seat, having a first fitting part (11), a second fitting part (12) in geared connection with the first fitting part (11), and a rotatably mounted eccentric (26, 27) driven by a driver (21, 26) to cause relative rolling between the first fitting part (11) and the second fitting part (12), the first fitting part (11) and the second fitting part (12) together form a disc-shaped unit held together by a clamping ring (51), and a third fitting part (74) can be both pivoted relative to the first fitting part (11) and locked with respect to the first fitting part (11).

27 Claims, 3 Drawing Sheets

FOREIGN PATENT DOCUMENTS

| | | |
|---|---|---|
| EP | 1 334 867 B1 | 8/2003 |
| WO | WO 03/024740 A1 | 3/2003 |
| WO | WO 2004/087458 A2 | 10/2004 |
| WO | WO 2004/103766 A1 | 12/2004 |
| WO | WO 2005/084996 A1 | 9/2005 |

* cited by examiner

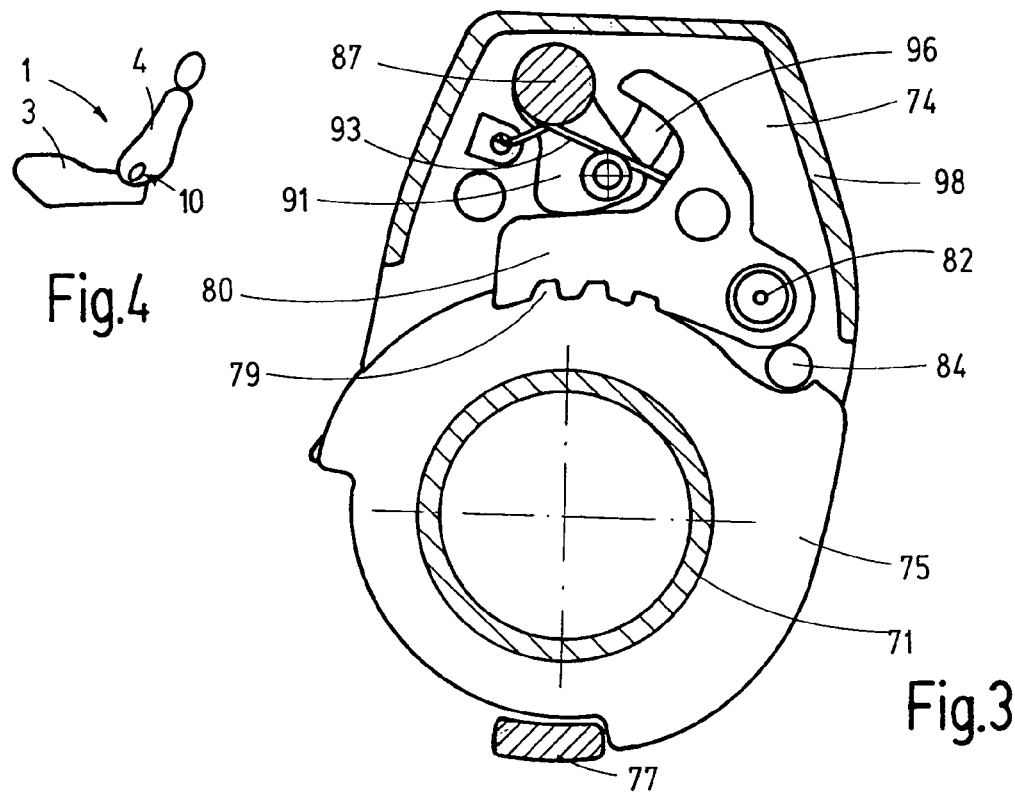
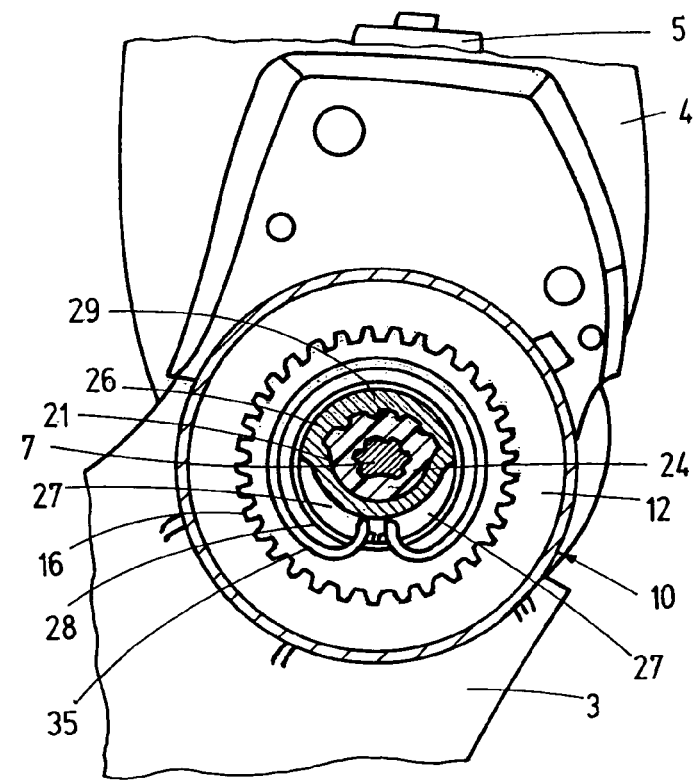

FITTING FOR A VEHICLE SEAT

RELATED APPLICATION

The present application claims priority to both DE 20 2006 013 783.1, which was filed Jan. 24, 2006, and DE 10 2006 044 490.6, which was filed Sep. 21, 2006. The entire disclosure of each of DE 20 2006 013 783.1 and DE 10 2006 044 490.6 is incorporated herein by reference.

BACKGROUND OF THE INVENTION

The present invention relates to a fitting for a vehicle seat, in particular for a motor vehicle seat, having a first fitting part, a second fitting part in geared connection with the first fitting part, and a rotatably mounted eccentric driven by a driver for generating relative rolling between the first fitting part and the second fitting part.

A fitting that is of the type described immediately above, and which is used in a vehicle seat to adjust the angle of inclination of a backrest relative to a seat part by way of a motor drive, is known from US 2005/0179297 A1. The fitting parts of that known fitting have radially projecting brackets by way of which the fitting is attached to the structures of the seat part and backrest, or to adapters connected to the seat part and backrest.

BRIEF SUMMARY OF SOME ASPECTS OF THE INVENTION

An aspect of the present invention is the provision of improvements to a fitting of the type described immediately above, for example to increase the range of applications for such a fitting.

In accordance with one aspect of the present invention, a fitting for a vehicle seat, in particular for a motor vehicle seat, includes a first fitting part, a second fitting part in geared connection with the first fitting part, and a rotatably mounted eccentric driven by a driver for generating relative rolling between the first fitting part and the second fitting part. In accordance with an exemplary embodiment of the present invention, the first fitting part and the second fitting part together structurally form a disc-shaped unit that is held together by a clamping ring, and the fitting further includes a third fitting part that is pivotable relative to the first fitting part and can be locked with respect to the first fitting part.

The use of an eccentric planetary gear permits the angle of inclination of the backrest to be steplessly adjusted. The eccentric planetary gear can be driven manually or by way of a motor. When driven by a motor, it is advantageous to use a two-part driver comprising a metal driving ring that can absorb and transmit the forces of a crash, and also a plastic driving bushing that introduces the drive forces. A transmission profile transmits the drive forces from the driving bushing to the driving ring. Manufacture of the driving bushing from plastic permits more complex geometries and reduces the production costs. In order to compensate for tolerances between the driving bushing and the driving ring, the material of the transmission profile of the driving bushing can preferably be displaced during assembly.

The disc-shaped unit of the first fitting part and the second fitting part, which is held together by the clamping ring, forms a compact shape that saves radial installation space and can be attached at various points. This increases the number of possible applications.

Using a third fitting part, which is pivotable relative to the first fitting part and can be locked with the first fitting part, it is possible to pivot the backrest freely, independently of the inclination setting, and without influencing that setting, i.e. in the case of two-door vehicles the backrest can be manually unlocked and pivoted forward in order to facilitate entry into the rear seats. This can occur in combination with sliding the vehicle seat forward. The number of possible areas of application and the comfort level are increased.

The fitting according to the exemplary embodiment of the invention is preferably designed to be driven by a motor, but it may also be manually driven. The exemplary embodiment of the invention may also be used for other motor-driven or manually driven geared fittings.

Other aspects and advantages of the present invention will become apparent from the following.

BRIEF DESCRIPTION OF THE DRAWINGS

The invention is described in more detail below with reference to an exemplary embodiment illustrated in the drawings, in which:

FIG. 2 shows a section through the exemplary embodiment along the line II-II in FIG. 1, with parts of the backrest and seat part being diagrammatically illustrated, FIG. 3 shows a section through the exemplary embodiment, along the line III-III in FIG. 1, FIG. 4 shows a diagrammatic illustration of a vehicle seat.

DETAILED DESCRIPTION OF EXEMPLARY EMBODIMENT

Figure 1:
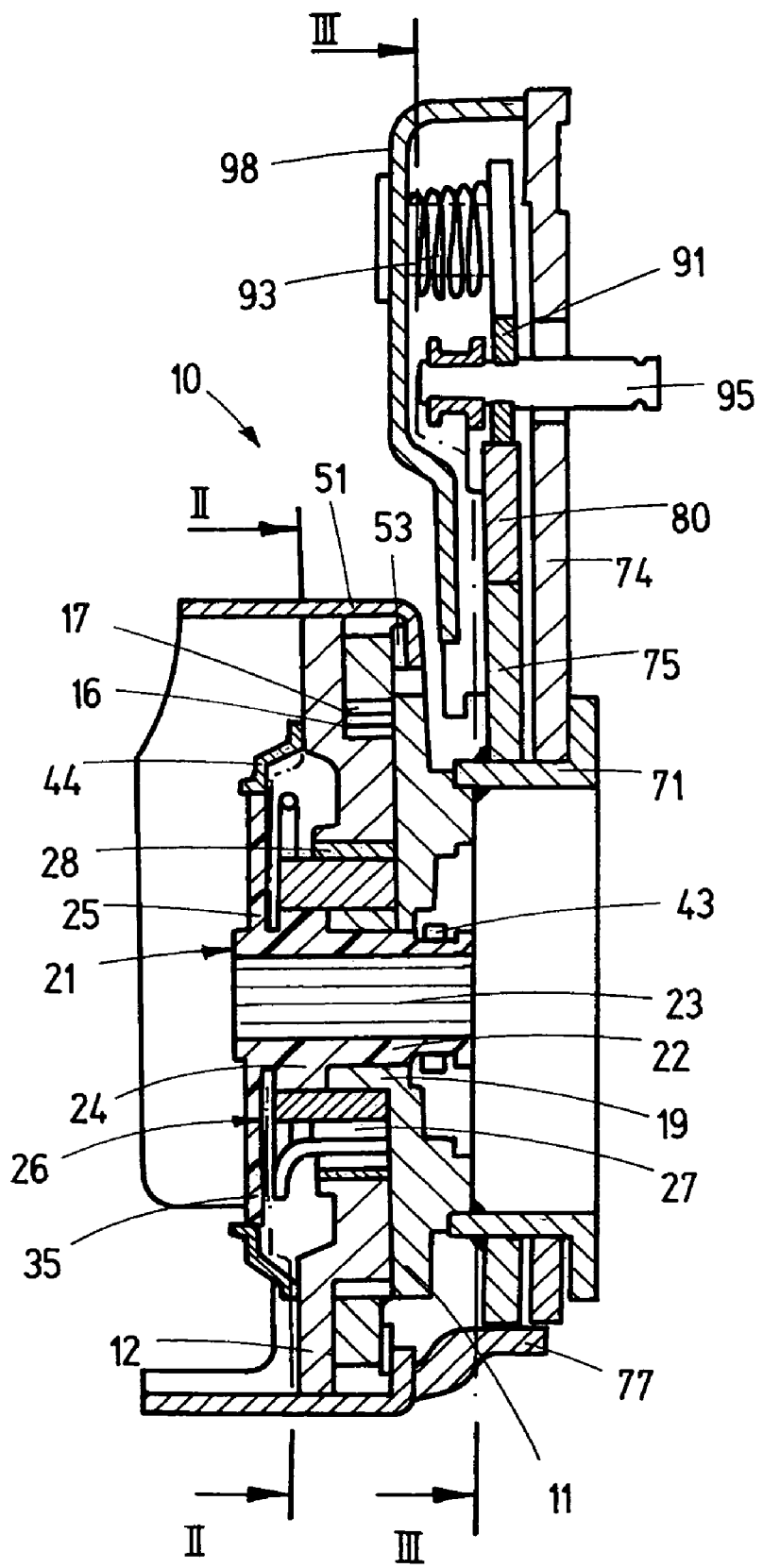
FIG. 1 shows a section through the exemplary embodiment.

A vehicle seat 1 for a motor vehicle includes a seat part 3 and a backrest 4. The inclination of the backrest 4 can be adjusted relative to the seat part 3 by way of a motor drive. An electric motor 5 mounted on the structure of the backrest 4 is provided as the driver for adjusting the inclination. The electric motor 5 rotates a drive shaft 7 which is arranged horizontally in the transition zone between the seat part 3 and the backrest 4. On both sides of the vehicle seat 1, the drive shaft 7 engages in a fitting 10 in a rotationally fixed manner that will be described further below. The drive shaft 7 defines the directional data of a cylindrical coordinate system which are used.

The fitting 10 is designed as a geared fitting in which a first fitting part 11 and a second fitting part 12 are connected with each other by way of a gear for the purpose of making and securing adjustments. More specifically, the first fitting part 11 and the second fitting part 12 are connected by way of an eccentric planetary gear—in the exemplary embodiment a self-locking planetary gear—as described, for example, in U.S. Pat. No. 6,619,743. The entire disclosure of U.S. Pat. No. 6,619,743 is incorporated herein by reference. The two fitting parts 11 and 12 are each disc-shaped and are made of steel. From a structural standpoint, the two fitting parts 11 and 12 together form a disc-shaped unit. The first fitting part 11 is assigned to the structure that carries the electric drive motor 5. In the exemplary embodiment, the second fitting part 12 is firmly connected with the structure of the seat part 3, i.e. it is fixedly attached to the seat part. In another arrangement of the electric motor, or in the case of manually driven fittings, the positions of the fittings 11 and 12 can be interchanged.

In order to form the gear mechanism, a toothed wheel 16 with external toothing is embossed on the second fitting 12, a toothed ring 17 with internal toothing is formed on the first fitting 11, and the toothed wheel and the toothed ring intermesh with each other. The diameter of the tip circle of the external toothing of the toothed wheel 16 is smaller by at least the height of one tooth than the diameter of the root circle of the internal toothing of the toothed ring 17. A corresponding difference of at least one tooth between the number of teeth in the toothed wheel 16 and in the toothed ring 17 permits the toothed ring 17 to roll on the toothed wheel 16.

Concentrically to the internal toothing of the toothed ring 17, the first fitting part 11 has an integrally formed collar element 19 on the side facing the toothed wheel 16. A driving bushing 21 is arranged with play by way of a hub 22 inside the collar element 19. The driving bushing 21 is made of plastic. The driving bushing 21 is provided with a receptacle (e.g., provided centrally with a borehole 23) for receiving the drive shaft 7. The profile of the borehole 23 matches the profile of the drive shaft 7, which in the exemplary embodiment is the profile of a splined shaft. Adjacent to its hub 22, the driving bushing 21 includes a step element 24 having a larger diameter than the hub 22, followed by a cover disc 25 having a larger diameter than the step element 24.

Over part of its circumference—in the exemplary embodiment over slightly less than half the circumference—the step element 24 includes a radially outwardly oriented external toothing with five teeth in the exemplary embodiment. In the area of the external toothing, the step element 24 carries a driving ring 26 having internal toothing in certain areas. The internal toothing of the driving ring 26 engages positively and completely (e.g., with very little or no play) with the external toothing of the step element 24. Instead of the toothings, other positive-fit transmission profiles using ribs, polygonal shapes or similar are possible. In order to eliminate the play in the positive connection between the internal toothing and the external toothing, the positive fit can be achieved during assembly by displacing the material of step element 24.

The driving ring 26 is made of metal, especially steel, and may be sintered. The driving ring 26 includes a greater axial length than the step element 24. The driving ring 26 is therefore connected only over part of its axial length with the driving bushing 21 by way of the transmission profile. Furthermore, the driving ring 26 is rotatably mounted on the collar element 19, i.e. it is supported on the collar element's outer surface. The driving bushing 21 and the driving ring 26 (in the part cooperating with the driving bushing 21) together define a driver.

The driving ring 26 supports two wedge segments 27 which, by way of their curved outer surfaces, support a sliding bearing bushing 28 which is pressed in a rotationally fixed manner into the second fitting part 12. The driving ring 26 includes a driving segment 29 which engages with play between the narrow ends of the wedge segments 27 and which bears the internal toothing on its radially inward-facing side. The driving segment 29, the step element 24 of the driving bushing 21 and a section of the borehole 23, together with the drive shaft 7, thus lie in one plane, whereby multi-axial stress states are avoided. Two projecting pins or, in general, lugs are integrally formed on the inwardly facing side of the cover disc 25 of the driving bushing 21, each with their end surfaces (e.g., tips) bearing on a respective one of the two wedge segments 27, to secure the wedge segments in the axial direction.

The broad ends of the wedge segments 27 face each other. Each of the broad ends of the wedge segments 27 accommodate, by way of a recess defined by projecting sections of material, an angled end finger of an annular spring 35. The spring 35 pushes the wedge segments 27 apart in the circumferential direction, so that in the event of the wedge segments 27 becoming blocked during operation or if the backrest 4 comes up against a load, the radially outer, projecting sections of material (which are located at the broad ends of the wedge segments 27) may come into contact with and act upon one another.

The driving bushing 21 is secured axially on the outside of the first fitting part 11 by way of a clipped-on securing ring 43. A sealing ring 44 is provided on the outside of the second fitting part 12, between the embossing for the toothed wheel 16 and the cover disc 25 of the driving bushing 21. A clamping ring 51 is provided in order to absorb the axially acting forces, i.e. to hold the fitting parts 11 and 12 together. The use of a clamping ring to hold parts together is described, for example, in U.S. Pat. No. 6,799,806. The entire disclosure of U.S. Pat. No. 6,799,806 is incorporated herein by reference. The clamping ring 51 is fixedly connected to the second fitting part 12, preferably welded to the second fitting part after first being pressed into place. In addition, the clamping ring 51 is fixedly connected to the structure of the seat part 3, preferably by welding. On one face side, the clamping ring 51 includes a radially inwardly bent edge by way of which it engages radially outwardly over the first fitting part 11, with a sliding ring 53 being interposed, without impeding the relative movement of the two fitting parts 11 and 12. As a result, the disc-shaped unit is formed. In accordance with the exemplary embodiment, the disc-shaped unit includes the fitting parts 11 and 12, and is held together by the clamping ring 51.

The driving ring 26 (more specifically the part of the driving ring supported on the collar element 19) and the wedge segments 27 define an eccentric which, by extension in the direction of the eccentricity, presses the toothed wheel 16 into the toothed ring 17 at an engagement point defined by the cooperative design/interaction between the toothed wheel, toothed ring and eccentric. When the drive force is provided by the rotating drive shaft 7, torque is transmitted first to the driving bushing 21 and then to the eccentric, so that the eccentric slides along the sliding bearing bushing 28, changing the direction of the eccentricity and thus changing the point of engagement of the toothed wheel 16 in the toothed ring 17, which manifests itself as a wobbling rolling movement, i.e. as relative rotation with a superimposed wobbling motion. The inclination of the backrest 4 can thus be steplessly adjusted between several use positions.

During an unlocked state discussed in greater detail below, the backrest 4 can be freely pivoted by way of the fitting 10, e.g., in order to facilitate access to a row of seats behind the vehicle seat 1. For example, the backrest 4 can be separately unlocked and manually pivoted forward, without moving the two fitting parts 11 and 12 relative to each other.

The fitting 10 comprises an annular-shaped bearing ring 71 that has a radially projecting flange at one end face, and is fixedly connected to the first fitting 11, preferably by laser welding, at its other end face. The fitting 10 further comprises a third fitting part 74 which is connected to the structure of the backrest 4, i.e. is fixedly attached to the structure of the backrest 4. The plate-shaped third fitting part 74 is pivotably supported on the bearing ring 71, so that the third fitting part is pivotable around the central axis defined by the drive shaft 7 in order to permit centered, free pivoting relative to the first fitting part 11; otherwise, however, the third fitting part is locked (e.g., indirectly locked) with the first fitting part 11. A separately formed, ring-shaped detent element 75 is axially arranged on the bearing ring 71 between the first fitting part 11 and the third fitting part 74, and is fixedly connected to the bearing ring 71, preferably by MAG welding. In order to limit the range of adjustment between the first and second fitting parts 11, 12, the detent element 75 can come to bear against a stopper 77 which projects axially from the clamping ring 51.

The detent element 75 serves to lock the third fitting element 74. For this purpose, the detent element 75 includes toothing 79. The pawl 80 is pivotably mounted on the third fitting part 74 by way of a bearing bolt 82. The pawl 80 is pivotable in the same plane as the detent element 75, and the first bearing bolt 82 runs parallel to the drive shaft 7. On the side facing the detent element 75 the pawl 80 is provided with toothing to interact with the toothing 79 of the detent element 75. A stop bolt 84 of the third fitting part 74 bears against the detent element 75 in the rearwards-pivoting direction of the third fitting element 74.

Figure 5:
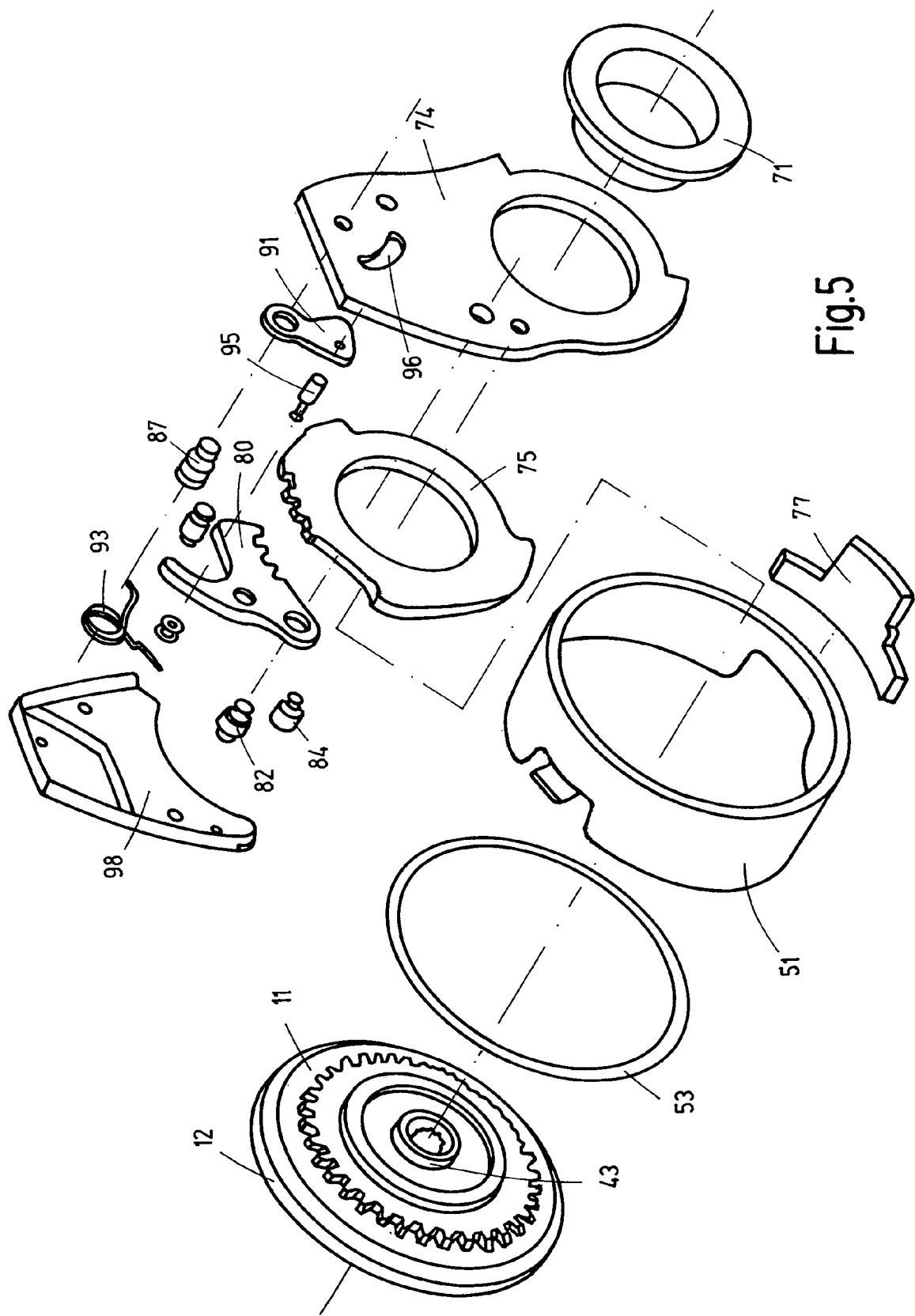
FIG. 5 shows an exploded illustration of the exemplary embodiment.

In accordance with the exemplary embodiment of the present invention, the detent element 75 and the pawl 80 can each be characterized as being part of a locking mechanism that is for: locking the third fitting part 74, to provide a locked state of the third fitting part (e.g., see FIG. 3); and unlocking the third fitting part, to provide an unlocked state of the third fitting part. Very generally described, FIG. 5 can be characterized as being schematically illustrative of the unlocked state, for example because in FIG. 5 the pawl 80 and the detent element 75 are not shown as being in locking engagement with one another.

Parallel to the first bearing bolt 82, a second bearing bolt 87 is arranged on the third fitting part 74. By way of the second bearing bolt 87, a securing element 91 is pivotably mounted on the third fitting part 74. The securing element 91 is pivotable in the same plane as the pawl 80 and is acted upon by a spring 93. The securing element 91 secures the locked state of the third fitting part 74 by acting on the pawl 80 to hold it engaged in the detent element 75. An unlocking pin 95 projects axially from the securing element 91 and passes outwards through a slot 96 in the third fitting part 74. Otherwise, the pawl 80 and the securing element 91 are protected by a cover 98 on the third fitting part 74.

The components required for the freely pivoting (e.g., of the third fitting part 74 relative to the first fitting part 11) can be grouped together in a prefabricated assembly. For this purpose, when the fitting 10 is being assembled the third fitting part 74 is provided with the stop bolt 84, the bearing bolts 82 and 87, the pawl 80, the securing element 91, the spring 93, the unlocking pin 95 and the cover 98. The fully assembled third fitting part 74 and the detent element 75 are slipped onto the bearing ring 71 and then the detent element 75 is fixedly connected directly to the bearing ring 71. This preassembled component is a testable unit whose functionality can be tested before further assembly of the fitting 10 takes place. The preassembled component is then installed by fixedly connecting the bearing ring 71 with the first fitting part 11.

In order to unlock the third fitting part 74—for example, by way of a manually operated lever for pulling a cable that is connected to the unlocking pin 95—the unlocking pin 95 is pivoted in the slot 96, thereby taking with it the securing element 91 and pivoting the securing element relative to the pawl 80. The pawl 80 is then no longer acted upon. The pivoting securing element 91 comes to bear against an unlocking finger (e.g., a substantially radially projecting unlocking finger) on the pawl 80, thereby pulling the pawl open. The pawl 80 is thus completely disengaged. The backrest 4 can now be freely pivoted forward. When the backrest 4 is being pivoted backwards, the stop bolt 84 comes to bear against the detent element 75, the pawl 80 again enters into its locking state and the securing element 91 secures this state.

Optionally, the setting reached by the freely pivoting can be secured, for example, by the pawl 80 or by a separate securing pawl as described in EP 1 334 867 B1. The entire disclosure of EP 1 334 867 B1 is incorporated herein by reference.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A fitting for a vehicle seat, the fitting comprising:
    a disc-shaped unit comprising a first fitting part and a second fitting part, wherein there is geared connection between the first fitting part and the second fitting part so that there can be relative rolling between the first fitting part and the second fitting part;
    a clamping ring that holds the disc-shaped unit together;
    a rotatably mounted eccentric for being driven, and for causing the relative rolling between the first fitting part and the second fitting part in response to the eccentric being driven;
    a driver for driving the eccentric so that the eccentric causes the relative rolling between the first fitting part and the second fitting part;
    a third fitting part mounted for being pivoted relative to the first fitting part for enabling centered, free pivoting of a backrest of the vehicle seat relative to the first fitting part, wherein
        the third fitting part being mounted for being pivoted relative to the first fitting part comprises the third fitting part being pivotably mounted on a bearing ring, and
        the bearing ring is fixedly connected to the first fitting part; and
    a locking mechanism for providing locked and unlocked states of the third fitting part, wherein
        the third fitting part is at least indirectly locked with respect to the first fitting part during the locked state of the third fitting part, and
        the third fitting part can be pivoted relative to the first fitting part during the unlocked state of the third fitting part.

2. The fitting according to claim 1, wherein the fitting is configured so that there is a superimposed wobbling motion during the relative rolling between the first fitting part and the second fitting part.

3. The fitting according to claim 1, wherein:
    the driver comprises a driving bushing made of plastic and a driving ring made of metal, and
    the driving bushing and the driving ring are connected to each other with a positive fit by way of a transmission profile.

4. The fitting according to claim 3, wherein:
    the transmission profile comprises a transmission profile of the driving bushing; and
    material of the transmission profile of the driving bushing is displaced during assembly of the driver.

5. The fitting according to claim 3, wherein the driving bushing has a receptacle for receiving a motor-driven drive shaft in a rotationally fixed manner.

6. The fitting according to claim 1, wherein the fitting is operative for steplessly adjusting inclination of a backrest of the vehicle seat by way of the relative rolling between the first fitting part and the second fitting part, which occurs in response to the eccentric being driven.

7. The fitting of claim 1 in combination with the vehicle seat, wherein the fitting is operative for at least both:

adjusting inclination of a backrest of the vehicle seat by way of the relative rolling between the first fitting part and the second fitting part, which occurs in response to the eccentric being driven; and enabling free pivoting of the backrest of the vehicle seat relative to both the first fitting part and the second fitting part.

8. The fitting according to claim 1, wherein the bearing ring being fixedly connected to the first fitting part comprises:
the bearing ring being welded to the first fitting part.

9. A fitting for a vehicle seat, the fitting comprising:
a disc-shaped unit comprising a first fitting part and a second fitting part, wherein
there is geared connection between the first fitting part and the second fitting part so that there can be relative rolling between the first fitting part and the second fitting part, and
the first fitting part includes a collar element;
a clamping ring that holds the disc-shaped unit together;
a rotatably mounted eccentric for being driven, and for causing the relative rolling between the first fitting part and the second fitting part in response to the eccentric being driven;
a driver for driving the eccentric so that the eccentric causes the relative rolling between the first fitting part and the second fitting part, wherein
the driver comprises a driving bushing made of plastic and a driving ring made of metal,
the driving bushing and the driving ring are connected to each other with a positive fit by way of a transmission profile,
the driving ring is mounted on the collar element, and
the driving bushing is mounted in the collar element with play;
a third fitting part mounted for being pivoted relative to the first fitting part; and
a locking mechanism for providing locked and unlocked states of the third fitting part, wherein
the third fitting part is at least indirectly locked with respect to the first fitting part during the locked state of the third fitting part, and
the third fitting part can be pivoted relative to the first fitting part during the unlocked state of the third fitting part.

10. The fitting according to claim 9, wherein the eccentric comprises:
a part of the driving ring which is mounted on the collar element, and
two oppositely tensioned wedge segments.

11. A fitting for a vehicle seat, the fitting comprising:
a disc-shaped unit comprising a first fitting part and a second fitting part, wherein there is geared connection between the first fitting part and the second fitting part so that there can be relative rolling between the first fitting part and the second fitting part;
a clamping ring that holds the disc-shaped unit together;
a rotatably mounted eccentric for being driven, and for causing the relative rolling between the first fitting part and the second fitting part in response to the eccentric being driven;
a driver for driving the eccentric so that the eccentric causes the relative rolling between the first fitting part and the second fitting part;
a third fitting part mounted for being pivoted relative to the first fitting part; and
a locking mechanism for providing locked and unlocked states of the third fitting part, wherein
the third fitting part is at least indirectly locked with respect to the first fitting part during the locked state of the third fitting part,
the third fitting part can be pivoted relative to the first fitting part during the unlocked state of the third fitting part,
the locking mechanism comprises a detent element for at least indirectly locking the third fitting part to the first fitting part, and
the detent element is formed separately from the first fitting part.

12. The fitting according to claim 11, wherein the detent element is at least indirectly fixedly connected to the first fitting part.

13. The fitting according to claim 11, wherein:
the locking mechanism comprises a pawl;
the pawl is carried by the third fitting part; and
the pawl is in locking engagement with the detent element during the locked state of the third fitting part.

14. The fitting according to claim 13, further comprising a spring-loaded securing element, wherein during the locked state of the third fitting part, the spring-loaded securing element secures the pawl in the locking engagement with the detent element.

15. The fitting according to claim 14, wherein the securing element can be pivoted relative to the pawl by moving an unlocking pin connected with the securing element.

16. The fitting according to claim 13, wherein:
a bearing ring is fixed with respect to the first fitting part;
the third fitting part is pivotably mounted on the bearing ring; and
the detent element is fixed with respect to, and carried by, the bearing ring.

17. The fitting according to claim 11, wherein the detent element is at least indirectly fixedly connected to the first fitting part.

18. The fitting according to claim 11, wherein:
the clamping ring is engaged radially outwardly over the first fitting part, and
the clamping ring extends circumferentially completely around the first fitting part.

19. The fitting according to claim 18, wherein the third fitting part is for enabling centered, free pivoting of a backrest of the vehicle seat relative to the first fitting part.

20. The fitting according to claim 19, wherein the third fitting part being mounted for being pivoted relative to the first fitting part comprises:
the third fitting part being pivotably mounted on a bearing ring.

21. The fitting according to claim 20, wherein the bearing ring is fixedly connected to the first fitting part.

22. A fitting for a vehicle seat, the fitting comprising:
a disc-shaped unit comprising a first fitting part and a second fitting part, wherein there is geared connection between the first fitting part and the second fitting part so that there can be relative rolling between the first fitting part and the second fitting part;
a clamping ring that holds the disc-shaped unit together;
a rotatably mounted eccentric for being driven, and for causing the relative rolling between the first fitting part and the second fitting part in response to the eccentric being driven;
a driver for driving the eccentric so that the eccentric causes the relative rolling between the first fitting part and the second fitting part;
a third fitting part mounted for being pivoted relative to the first fitting part for enabling centered, free pivoting of a backrest of the vehicle seat relative to the first fitting part, wherein the third fitting part being mounted for being pivoted relative to the first fitting part comprises the third fitting part being pivotably mounted on a bearing ring; and a locking mechanism for providing locked and unlocked states of the third fitting part, wherein the third fitting part is at least indirectly locked with respect to the first fitting part during the locked state of the third fitting part, and the third fitting part can be pivoted relative to the first fitting part during the unlocked state of the third fitting part, a preassembled component comprises the third fitting part and at least a portion of the locking mechanism, the locking mechanism comprises a detent element for at least indirectly locking the third fitting part to the first fitting part, the detent element is formed separately from the first fitting part, and the detent element is fixedly connected to the bearing ring.

23. The fitting according to claim 22, wherein the bearing ring is fixedly connected to the first fitting part.

24. A fitting for a vehicle seat, the fitting comprising:

a disc-shaped unit comprising a first fitting part and a second fitting part, wherein there is geared connection between the first fitting part and the second fitting part so that there can be relative rolling between the first fitting part and the second fitting part;

a clamping ring that holds the disc-shaped unit together;

a rotatably mounted eccentric for being driven, and for causing the relative rolling between the first fitting part and the second fitting part in response to the eccentric being driven;

a driver for driving the eccentric so that the eccentric causes the relative rolling between the first fitting part and the second fitting part;

a third fitting part mounted for being pivoted relative to the first fitting part, wherein the third fitting part is for enabling centered, free pivoting of a backrest of the vehicle seat relative to the first fitting part, the third fitting part being mounted for being pivoted relative to the first fitting part comprises the third fitting part being pivotably mounted on a bearing ring; and a locking mechanism for providing locked and unlocked states of the third fitting part, wherein the third fitting part is at least indirectly locked with respect to the first fitting part during the locked state of the third fitting part, and the third fitting part can be pivoted relative to the first fitting part during the unlocked state of the third fitting part, the locking mechanism comprises a detent element for at least indirectly locking the third fitting part to the first fitting part, the detent element is formed separately from the first fitting part, and the detent element is carried by, and fixed with respect to, the bearing ring.

25. A fitting for a vehicle seat having a backrest whose inclination can be adjusted, the fitting comprising:

a disc-shaped unit comprising a first fitting part and a second fitting part, wherein there is geared connection between the first fitting part and the second fitting part so that the first fitting part can roll relative to the second fitting part;

a clamping ring that holds the disk-shaped unit together;

a rotatably mounted eccentric for being driven, and for causing the first fitting part to roll relative to the second fitting part in response to the eccentric being driven;

a driver for driving the eccentric so that the eccentric causes the first fitting part to roll relative to the second fitting part;

a third fitting part for guiding movement of the backrest, wherein the third fitting part is mounted so that the third fitting part can be freely pivoted relative to the first fitting part during an unlocked state of the third fitting part, and the third fitting part moves with the first fitting part when the first fitting part rolls relative to the second fitting part during an unlocked state of the third fitting part; and a detent element, wherein the detent element at least indirectly locks the third fitting part to the first fitting part during the locked state of the third fitting part, and the detent element is formed separately from the first fitting part.

26. A fitting according to claim 25, wherein:

a bearing ring is fixed with respect to the first fitting part, so that the bearing ring moves with the first fitting part when the first fitting part rolls relative to the second fitting part;

the third fitting part is pivotably mounted on the bearing ring;

the detent element is fixed with respect to, and carried by, the bearing ring;

a pivotably mounted pawl is carried by the third fitting part; and the pawl is in locking engagement with the detent element during the locked state of the third fitting part.

27. The fitting of claim 26 in combination with the vehicle seat, wherein the backrest of the vehicle seat is fixedly attached to the third fitting part so that, by way of the third fitting part:

the backrest can be freely pivoted during the unlocked state of the third fitting part, and the backrest moves with the first fitting part when the first fitting part rolls relative to the second fitting part during a locked state of the third fitting part.

* * * * *